(12) United States Patent
Moroski et al.

(10) Patent No.: US 11,122,053 B2
(45) Date of Patent: Sep. 14, 2021

(54) FLEXIBLE RIGHTS MANAGEMENT FOR CLOUD-BASED ACCESS TO COMPUTING RESOURCES

(71) Applicant: VMWARE, INC., Palo Alto, CA (US)

(72) Inventors: Jeff Moroski, South Abington Township, PA (US); Ron Passerini, Cambridge, MA (US); John Kilroy, Portsmouth, NH (US)

(73) Assignee: VMWARE, INC., Palo Alto, CA (US)

( * ) Notice: Subject to any disclaimer, the term of this patent is extended or adjusted under 35 U.S.C. 154(b) by 324 days.

(21) Appl. No.: 16/251,493

(22) Filed: Jan. 18, 2019

(65) Prior Publication Data

US 2020/0236115 A1    Jul. 23, 2020

(51) Int. Cl.
*H04L 29/06* (2006.01)
*G06F 21/62* (2013.01)
*H04L 12/24* (2006.01)
*G06F 9/50* (2006.01)
*G06F 21/60* (2013.01)

(52) U.S. Cl.
CPC .......... *H04L 63/105* (2013.01); *G06F 9/5077* (2013.01); *G06F 21/604* (2013.01); *G06F 21/6218* (2013.01); *H04L 41/0806* (2013.01); *H04L 63/0272* (2013.01); *H04L 63/102* (2013.01); *H04L 63/104* (2013.01); *G06F 2221/2141* (2013.01)

(58) Field of Classification Search
CPC ... H04L 63/105; H04L 41/08; H04L 63/0272; H04L 63/102; H04L 63/104; H04L 41/28; H04L 67/10; G06F 9/5077; G06F 21/604; G06F 21/6218; G06F 2221/2141
See application file for complete search history.

(56) References Cited

U.S. PATENT DOCUMENTS

| | | | |
|---|---|---|---|
| 2013/0007845 A1* | 1/2013 | Chang | H04L 63/104 726/4 |
| 2013/0212160 A1* | 8/2013 | Lawson | H04L 67/02 709/203 |
| 2016/0253078 A1* | 9/2016 | Ebtekar | H04L 41/145 715/735 |
| 2019/0014120 A1* | 1/2019 | Drabant | G06F 9/4451 |

* cited by examiner

*Primary Examiner* — Joseph P Hirl
*Assistant Examiner* — Rodney E. Haven
(74) *Attorney, Agent, or Firm* — Clayton, McKay & Bailey, PC

(57) ABSTRACT

An example method for assigning rights to utilize cloud resources associated with a service provider's computing hardware is provided. The example method can include defining a rights package including multiple rights pertaining to utilization of the cloud resources. The rights package can be assigned across multiple tenants of the service provider. The example method can also include defining a global role that includes potential rights, where the global role is assignable to individual tenant users of the tenant. The global roles can be made available to multiple tenants using the service provider. The method can further include provisioning filtered rights to utilize the cloud resources to a tenant user of the tenant, the tenant user being assigned the global role. The filtered rights can include rights present in both the potential rights defined for the global role and the rights defined for the rights package.

20 Claims, 11 Drawing Sheets

ADD RIGHTS BUNDLE

NAME * ~810

DESCRIPTION ~820

RIGHTS IN BUNDLE

| NAME | □ VIEW | □ MANAGE |
|---|---|---|
| ACCESS CONTROL | | |
| > ORGANIZATION | | |
| > RIGHT | | |
| > ROLE | | |
| > USER | | |
| ADMINISTRATION | | |

GENERAL
- □ VIEW
- □ VIEW CELL CONFIGURATION
- □ ADMINISTRATOR VIEW
- □ VIEW ERROR DETAILS

- □ MANAGE
- □ ADMINISTRATOR CONTROL
- □ SEND NOTIFICATION
- □ EXECUTE SYSTEM OPERATIONS

[DISCARD] ~840
[SAVE] ~850

FIG. 8

FLEXIBLE RIGHTS MANAGEMENT FOR CLOUD-BASED ACCESS TO COMPUTING RESOURCES

BACKGROUND

Cloud-based computing continues to gain popularity and market share, allowing an entity to leverage additional computing resources on demand and at competitive prices. An entity leveraging the cloud-based computing resources can be considered a "tenant," while the provider of such resources can be considered a "service provider." A service provider can own the physical computing hardware (including processors, memory, and storage) and offer remote use of those resources to one or more tenants.

In some examples, multiple tenants can utilize the same physical computing hardware from a single service provider. Various rules and profiles can be used to secure each tenant's data and ensure that the data remains in a virtual "silo" only accessible to the associated tenant. The basic concept of rights management within this infrastructure allows multiple tenants to use a service provider while ensuring their data remains secure and unavailable to any other tenants or third parties.

Additionally, a single tenant can have many users that need to access the service provider's resources. Among these users, the tenant may wish to provide varying degrees of access. One user can be an administrator for the tenant needing more extensive access, for example, while another user can be a typical employee with only basic computing needs. To further complicate matters, different tenants may desire different levels of control for their individual users relative to other tenants and their users. To provide varying rights among different tenants and their particular users, additional levels of rights management are necessary.

In previous solutions, service providers offered rights management in a similar manner across all tenants. This solution lacked the ability to allow tenants to customize roles for their particular users. Another solution went in the opposite direction, allowing customizable roles for all users of each tenant. This solution produced other problems, such as requiring extra configuration work from tenants that desire a more automated experience.

As a result, a need exists for systems and methods for providing flexible rights management for cloud-based access to computing resources.

SUMMARY

Examples described herein include systems and methods for providing flexible rights management for cloud-based access to computing resources. Rights management can be offered to a service provider through a software platform such as VMware™ vCloud Director™. According to the present disclosure, rights management can be provided by structuring collections of rights referred to as "rights packages," "global roles," and "tenant roles."

As used herein, a rights package can be a group of rights made generally available to a tenant by a service provider. In some examples, a service provider and tenant can enter into a service contract that references a predefined collection of rights, such as "bronze," "silver," or "gold" levels. In those examples, a rights package can define the collection of rights associated with the selected level. In other examples, a rights package can define a collection of rights associated with a licensable feature or functionality, such as dynamic routing configuration or enhanced metrics collections. A service provider can assign or revoke rights packages to a tenant on demand. Some rights packages can be marked for default assignment to newly provisioned tenants.

Updating a rights package can have the immediate impact of modifying the effective set of rights to all tenants assigned that rights package. For example, if the "bronze" rights package is updated by the service provider to include a new feature, all tenants assigned the "bronze" rights package would immediately receive access to that new feature.

Service providers can also create global roles. As used herein, a global role is a collection of rights, applied equally across tenants, that can be made potentially available to individual users of a tenant. For example, a global role for an administrator can grant the administrator with rights to provision a certain number of virtual machines. If the service provider updates the global role for an administrator to change the number of virtual machines that can be provisioned, this update would automatically apply to all users designated with that global role, across different tenants.

Whether a particular user would be able to exercise all rights granted by a global role would depend on the rights package granted to that user's tenant. For example, a global role for an administrator might allow the administrator to provision up to 20 virtual machines. But a particular tenant may have the "bronze" rights package, which only allows up to 10 virtual machines. If that tenant assigns the administrator global role to one of its users, that user would only be able to provision up to 10 virtual machines even though the global role could potentially support more. If that tenant upgrades to a "silver" rights package that allows up to 20 virtual machines, the administrator user would then be able to provision up to 20 virtual machines. Similarly, if the tenant upgrades to a "gold" rights package that allows up to 30 virtual machines, the administrator user would still be constrained to 20 virtual machines by way of the global role assigned to the administrator. In other words, the global role can provide potential rights to a tenant's user, but only those rights that are assigned to the tenant by way of a rights package will be made available to that user.

As referenced above, rights packages and global roles can be generated by the service provider and applied across tenants. When a change is made to a rights package or global role, that change can automatically apply to all of the service provider's tenants and their users. But in some situations, a tenant may wish to designate customized roles to its users. This tenant can utilize "tenant roles." As used herein, a tenant role is a collection of rights, applied only to one tenant, that can be made potentially available to individual users of that tenant. Tenant roles can allow a tenant to create, modify, and delete roles in a self-service fashion, without relying on preset global roles. As with global roles, tenant roles can make certain rights available to certain users, but those users will ultimately only gain access to those rights which are granted to the tenant through a rights package, in an example.

An example method for assigning rights to utilize cloud resources associated with a service provider's computing hardware is provided. The example method can include defining a rights package including multiple rights pertaining to utilization of the cloud resources. The rights package can reflect rights defined by a service contract between a service provider and a tenant of the service provider's computing hardware, for example, and can be assignable to that tenant. The same rights package can be assigned to multiple tenants using the service provider's computing hardware. Modifying the rights package by the service provider can cause the assigned rights packages to automatically update for each tenant assigned that rights package.

The example method can also include defining a global role including multiple potential rights, where the global role is assignable to individual tenant users of the tenant. The global roles can be made available to multiple tenants using the service provider. The method can further include provisioning filtered rights to utilize the cloud resources to a tenant user of the tenant, the tenant user being assigned the global role. The filtered rights can include rights present in both the potential rights defined for the global role and the rights defined for the rights package.

The example method can include defining a local role that includes potential rights. The local role can be defined by a tenant and specific to that tenant. The method can further include provisioning custom rights to utilize the cloud resources to a user assigned the local role. The custom rights can be rights included in both the potential rights defined for the local role as well as the rights present in the rights package for the tenant.

In an example method, an individual tenant user can be authorized to exercise a VPN right pertaining to configuring VPN access to the cloud resources based on the VPN right being contained in both the global role assigned to the individual tenant user and the rights package assigned to the tenant associated with the individual tenant user. The VPN right is merely one of many example rights that can be conveyed to tenants and their users.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 8 is another example GUI for creating and assigning rights bundles.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

An example method for assigning rights to utilize cloud resources associated with a service provider's computing hardware is provided. The example method can include defining a rights package including multiple rights pertaining to utilization of the cloud resources. The rights package can be assigned across multiple tenants of the service provider. The example method can also include defining a global role that includes potential rights, where the global role is assignable to individual tenant users of the tenant. The global roles can be made available to multiple tenants using the service provider. The method can further include provisioning filtered rights to utilize the cloud resources to a tenant user of the tenant, the tenant user being assigned the global role. The filtered rights can include rights present in both the potential rights defined for the global role and the rights defined for the rights package.

Figure 1:
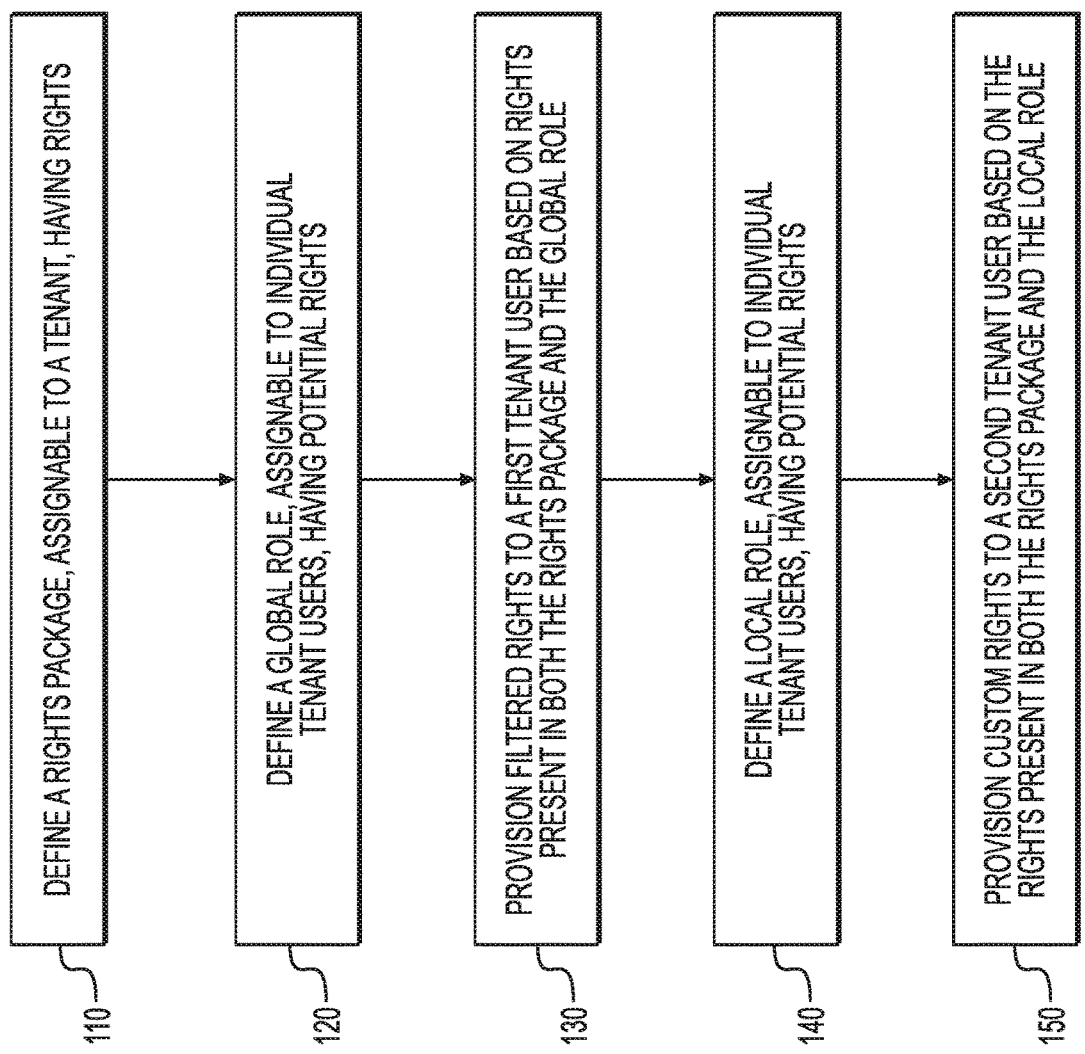
FIG. 1 is a flowchart of an example method for managing rights to utilize cloud resources associated with a service provider's computing hardware.
Figure 6:
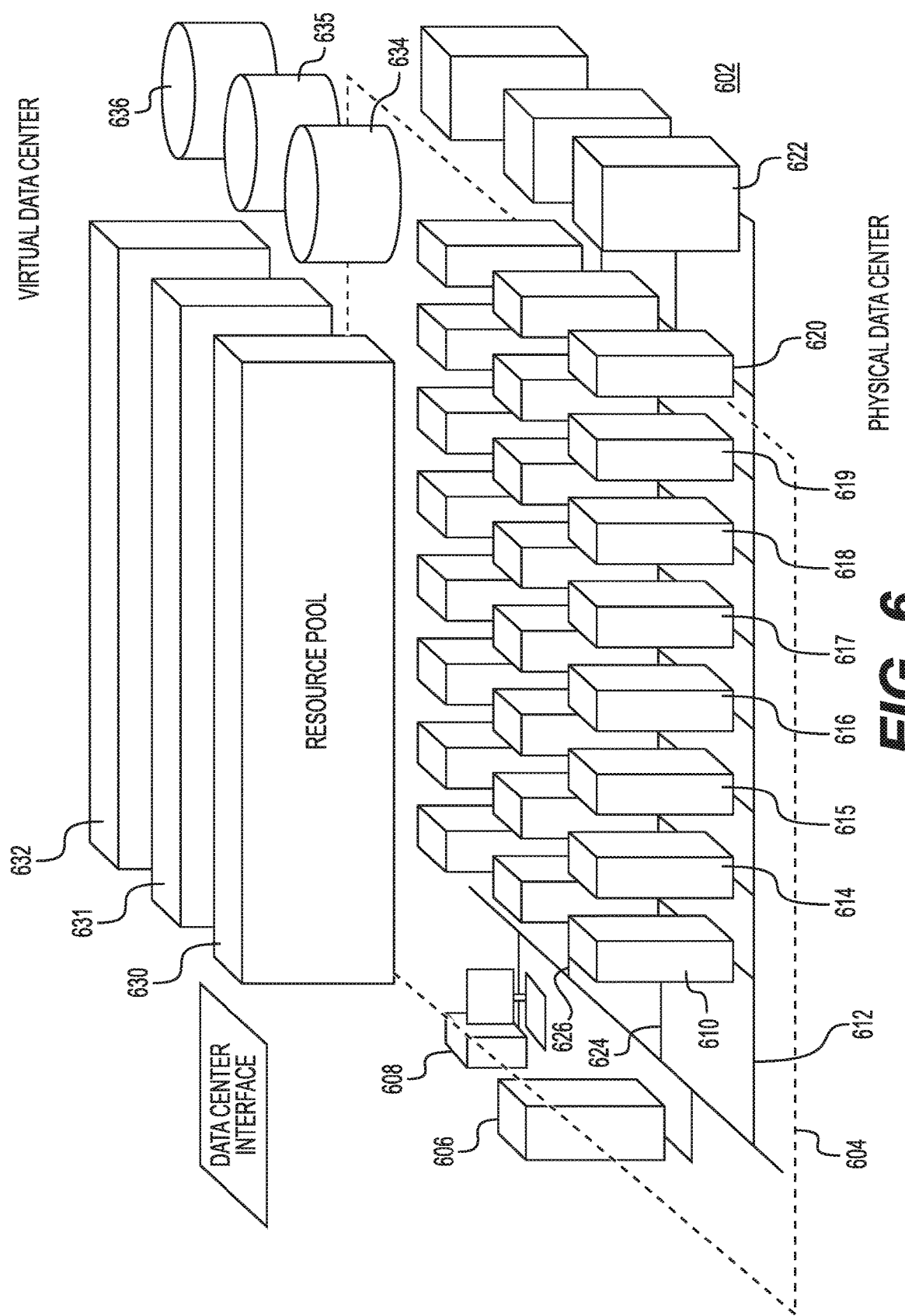
FIG. 6 is an illustration of an example data center that a service provider can make available to multiple tenants.

FIG. 1 provides a flowchart of an example method for managing rights to utilize cloud resources associated with a service provider's computing hardware. Stage 110 of the method can include defining a rights package. The rights package can be defined by a service provider that provides or otherwise controls computing resources, such as a data center as depicted by FIG. 6. It can be assigned to one or more tenants that use the computing resources of the data center. The rights package can include one or more rights relevant to utilizing the computing resources of the data center.

A "right," as used herein, can refer to the fundamental unit of access control in a software-based control system for the data center. Rights can fall into at least two general categories, such as "View" and "Manage." View rights can include read-based rights that allow a tenant or user to read or view information related to the data center. Manage rights can include write and execute capabilities. Some rights can imply additional rights. For example, a manage right that includes the ability to edit or change an object would imply the view right to view that object. The rights can be accessed through a user interface of a control system. An example of such a control system is VMware™ vCloud Director™. The software-based control system can be used by the provider to create and assign rights. It can also be used by a tenant to configure available rights, assign available global roles, or create local roles.

A rights package can be a service-provider-facing construct. A service provider can create rights packages that correspond to tiers of service, separately monetizable functionality, or any other arbitrary grouping they come up with. When a rights bundle is created, it can be published to one or more tenants. Doing so will explicitly grant the tenant access to all the rights in the bundle. Multiple rights bundles can be applied to a tenant at the same time.

As an example, a "Gold Tier" rights package can include all rights granted by a "Gold" tier of service, while a "Silver Tier" rights package can include all rights granted by a "Silver tier of service. The Gold Tier can include additional rights that are not included in the Silver Tier, such as the right to utilize additional virtual machines ("VMs") or CPUs of the service provider. Separately, an additional rights bundle can apply to optimization functionality, such as providing access to a visual display of CPU usage over time for organizational groups of a tenant. The tenant can select the Silver Tier as well as the additional optimization rights package, and both packages can be provisioned to the tenant. To the extent the different packages included different rights, those rights would be additive and all of them would be made available to the tenant after being provisioned.

Stage 120 of the method can include defining a global role. The global role can include potential rights that are assignable to individual tenant users. Global roles can be managed by either the service provider or the tenant, or both. The software-based control system can be configured in any of those potential configurations. Global roles are similar to rights packages in that they can include a bundle of rights. However, global roles differ from rights packages in that the global roles are assignable to individual users rather than overall tenants of the service provider. The rights provided by global roles are referred to herein as "potential rights" in order to distinguish from the rights within rights packages, but it should be understood that potential rights and rights can be the same.

For example, a rights package can include optimization rights described above. The service provider can assign the rights package to a tenant, meaning that the tenant generally has permission to utilize the optimization rights, including for example viewing a GUI that visually displays optimization measures. Separately, an administrator global role can be created by the service provider in an example. The administrator global role can include various potential rights, including the potential right to utilize optimization rights. If the tenant assigned the administrator global role to one of its users, that user would then be able to access the optimization rights. In this example, access to the optimization rights would be granted to the user based on the global role including the potential right in addition to the rights package for the tenant including that right.

The intersection of rights packages and global roles can also work in the other direction. For example, a global role can include multiple potential rights such as an optimization right, a VM creation right, and a VM termination right. A tenant can assign the global role to an administrator user. In this example, the tenant has been assigned a rights package that includes the optimization right, but not the VM creation right or the VM termination right. As a result, the administrator user would only be able to access the optimization right. The VM creation right and VM termination rights would be potential rights of the global role, but because the tenant itself has not been granted those rights through a rights package, the user would not be able to access those potential rights.

The intersection of rights within a rights package and potential rights within a global role can be considered filtered rights. This terminology refers to the fact that the usable rights, as described previously, are rights that intersect both a rights package and a global role. In that way, the usable rights are "filtered" through those two layers of rights bundles.

Stage 130 can include provisioning filtered rights to a first tenant user based on rights present in both the rights package and the global role. The concept of filtered rights has been explained previously. The provisioning at stage 130 can include allowing access to those filtered rights through the software-based control system for the data center. This can be accomplished by software code or a software module that obtains a data object associating one or more rights packages to a tenant, obtains a data object associating one or more potential rights to a global role, receiving information regarding a tenant user that belongs to the tenant and has been assigned a global role, and determining which rights and potential rights intersect for that tenant. Based on that determination, the control system can allow that user to perform actions or receive information as defined by the intersecting rights.

Stage 140 can include defining a local role, assignable to individual tenant users, having potential rights. Local roles differ from global roles in that the local role is specific to a particular tenant while global roles are applicable across tenants. In the previous example of a global role having an optimization right, for example, multiple tenants using a single service provider could assign or otherwise utilize that global role. The global role would include the same potential rights for each tenant. A local role, on the other hand, can be created by the tenant and apply only to that tenant.

As an example, a service provider may have three tenants that make use of the service provider's cloud-computing infrastructure. A first tenant can create a local developer role that includes potential rights for testing objects. A second tenant, using the same infrastructure, can create its own local developer role that includes potential rights for both testing and creating objects. Even though these two local roles use the same terminology and apply to the same infrastructure, they would include different potential rights for users associated the first and second tenants. Of course, the individual users would only be able to use those potential rights based on those rights being in one or more rights packages assigned to the associated tenant.

Specifically, at stage 150, the service provider can provision custom rights to a second tenant user based on the rights present in both the rights package and the local role. Continuing the example above, a rights package can include the right to test objects but not to create them. That rights package can be assigned to both the first and second tenants. The first tenant's user, assigned a local developer role that includes the potential right for testing objects, would be provisioned the right to test objects based on that right being an intersection of (i.e., present in both) the rights package and the local role. The second tenant's user, assigned a local developer role that includes the potential rights for testing and creating objects, would be provisioned the right to test objects but not to create them. This is because the testing right is present in both the rights package and the local role, while the creating right is not present in the rights package.

Figure 2:
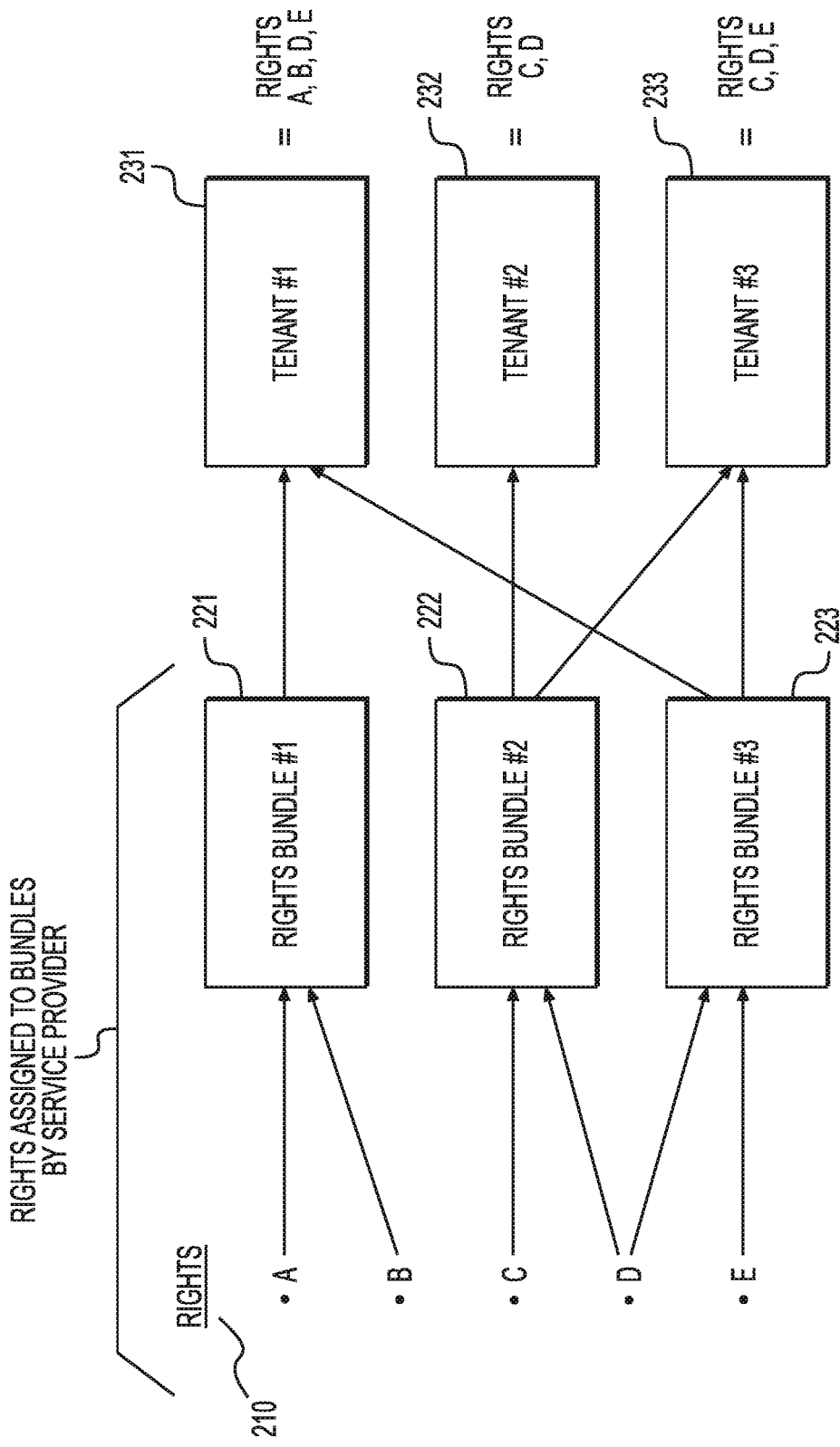
FIG. 2 is a diagram of an example method for assigning rights bundles to tenants.

FIG. 2 provides a diagram of an example method for creating rights packages and assigning them to tenants. The phrase "rights package" can be considered interchangeable with the phrase "rights bundle" for the purposes of this disclosure. As shown in FIG. 2, a service provider can have a pool 210 of available rights, represented by the letters "A" through "E," that can each be assigned to one or more rights packages.

Rights A through E can be any type of rights relevant to a data servers or cloud-based infrastructures. For example, the rights can relate to functionality associated with a standard, or preconfigured, virtual machine, such as creating, editing, configuring, sharing, downloading, or migrating the preconfigured virtual machine. Similarly, the rights can relate to viewing, editing, sharing, or otherwise changing a template for preconfigured virtual machines. The rights can also include organization-related rights, such creating, deleting, editing, viewing, organizations or settings for those organizations. Rights can also relate to a gateway, such an organization gateway that controls access to the datacenter for the organization. The rights associated with the gateway can be similar to other gateway-related rights, such as rights related to a firewall, load balancer, VPN, remote access, and related configuration items. Rights can also relate to hybrid cloud operations, such as creating, viewing, deleting, modifying, or updating a to-the-cloud tunnel. Rights can also relate to provider functions such as creating, deleting, editing, viewing, and merging a virtual data center. Similarly, the rights can include functionality associated with a storage policy for the virtual data center, such as viewing, editing, enabling, or managing the storage policy. Similar rights can apply to service libraries, Kerberos settings, system settings, service resources, cloud tunnel servers, and any other rights or settings relevant to data servers or cloud-based infrastructures.

As shown in FIG. 2, the various rights 210 can be assigned to one or more rights packages 221, 222, 223. This can be performed using a software-based control system, such as VMware™ vCloud Director™. The service provider that provides the physical infrastructure can utilize the control system to configure these rights packages 221, 222, 223, in an example. In FIG. 2, rights bundle #1 (221) has been created by assigning rights A and B to that package. Similarly, rights C and D are assigned to rights bundle #2 (222), and rights D and E are assigned to rights bundle #3 (223). There is no requirement that all rights 210 be assigned to rights bundles, and rights 210 can be assigned to multiple rights bundles as desired.

FIG. 2 also shows assigning the rights bundles 221, 222, 223 to one or more tenants. As described earlier, the different tenants 231, 232, 233 are separate users (typically each a standalone enterprise) of the service provider's infrastructure. Each tenant 231, 232, 233 can include various users with customized rights profiles. But the assignment of rights bundles 221, 222, 223 determines the universe of rights available to a tenant. For example, rights bundles #1 and #3 (221, 223) are assigned to tenant #1 (231) in FIG. 2. As a result, tenant #1 (231) has been assigned all rights within rights bundles #1 and #3 (221, 223). Because rights bundle #1 (221) includes rights A and B, and rights bundle #3 (223) includes rights D and E, tenant #1 (231) would be assigned rights A, B, D, and E.

Similarly, as shown in FIG. 2, tenant #2 (232) has been assigned rights bundle #2 (222), which includes rights C and D. Tenant #2 (232) has therefore been assigned rights C and D. Tenant #3 (233) has been assigned rights bundles #2 and #3 (222, 223). Rights bundle #2 (222) includes rights C and D, while rights bundle #3 (223) includes rights D and E. As a result, tenant #3 (233) would be assigned rights C, D, and E. The duplicative nature of right D (being present in both rights bundles #2 and #3 (222, 223)) would not change the nature of the grant, and tenant #3 (233) would be assigned right D in the same manner as the other rights.

Figure 3:
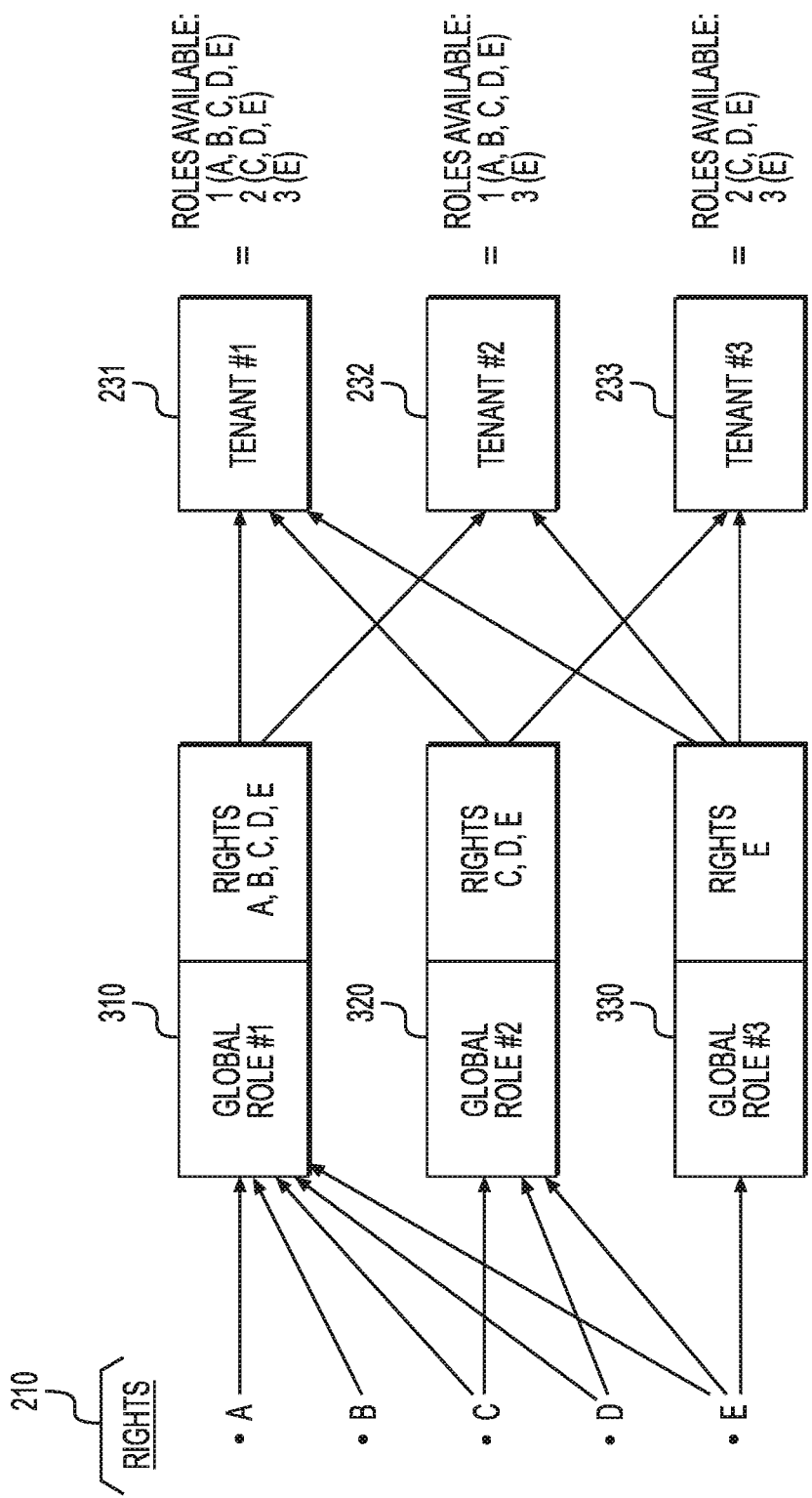
FIG. 3 is a diagram of an example method for assigning rights to global roles and assigning those global roles to tenants.

FIG. 3 provides a diagram of an example method for assigning rights to global roles and assigning those global roles to tenants. FIG. 3 builds upon the information presented in FIG. 2, discussed previously. FIG. 3 shows the same set of assignable rights, A-E, that were assigned to rights bundles in FIG. 2. In this example, a service provider assigns rights within the available pool 210 of rights to various global roles 310, 320, 330 that can be used across tenants 231, 232, 233.

Specifically, in this example, the service provider can assign rights A, B, C, D, and E to global role #1 (310). This could be an administrative or management type role, for example, requiring a broad range of rights. The service provider can assign rights C, D, and E to global role #2 (320), and assign right E to global role #3 (330). These roles can be tailored to common roles used by tenants, for example.

FIG. 3 also shows assigning the global roles 310, 320, 330 to various tenants. In particular, tenant #1 (231) has been assigned global roles #1, #2, and #3 (310, 320, 330). As a result, each of these three global roles is available to tenant #1 (231), which in turn means that the rights within each of the three global roles (A, B, C, D, and E) are potentially available to tenant #1 (231) (depending upon the intersection of the rights bundles assigned to the tenant in FIG. 2 with those potential rights assigned to the global roles, as described in more detail with respect to FIG. 4).

Continuing with FIG. 3, tenant #2 (232) has been assigned global roles #1 and #3 (310, 330). As a result, each of these two global roles are available to tenant #2 (232), which in turn means that the rights within each of the two global roles (A, B, C, D, and E) are potentially available to tenant #2 (232) (pending their intersection with the relevant rights bundles). Additionally, tenant #3 (233) has been assigned global roles #2 and #3 (320, 330), meaning that the rights within each of these two global roles (C, D, and E) are potentially available to tenant #3 (233) (pending their intersection with the relevant rights bundles).

Figure 4:
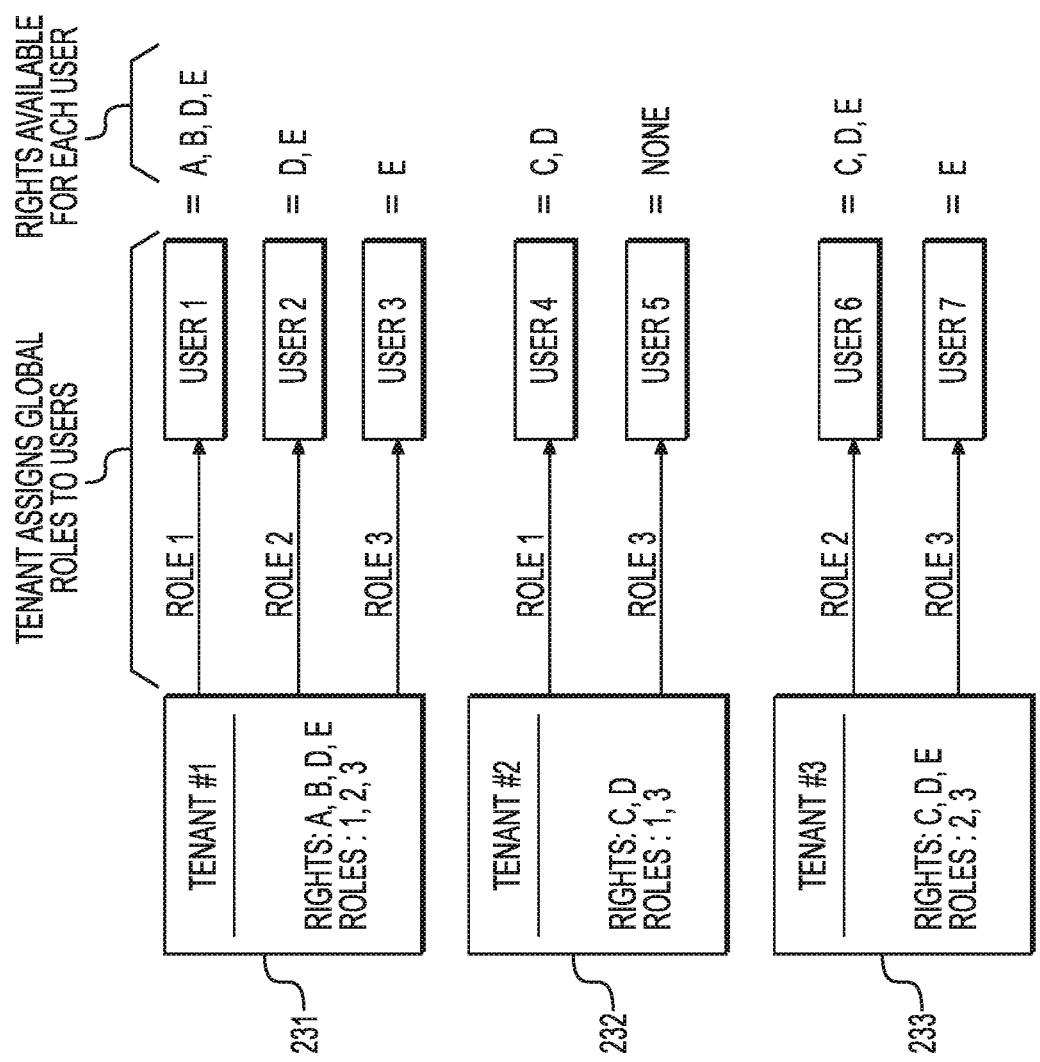
FIG. 4 is a diagram of an example method for assigning global roles to users within a tenant.

FIG. 4 brings together the concepts of FIGS. 2 and 3, showing the aforementioned intersection of rights. This example shows the same three tenants 231, 232, 233 discussed in association with the previous two drawings. As described previously and reflected again in FIG. 4, tenant #1 (231) has been assigned rights A, B, D, and E—via rights bundles #1 and #3 (221, 223)—and global roles #1, #2, and #3 (310, 320, 330). In this example, tenant #1 (231) has three tenant users denoted as User 1, User 2, and User 3. Tenant #1 (231) can assign any of available global roles #1, #2, and #3 (310, 320, 330) to any of these three users. In this example, global role #1 (310) is assigned to User 1, global role #2 (320) is assigned to User 2, and global role #3 (330) is assigned to User 3. The rights available to each of these users will differ and are explored further herein.

With respect to User 1, the rights available to that user (i.e., the filtered rights) are those that exist in the intersection between global role #1 (310), assigned to User 1, and rights bundles #1 and #3 (221, 223) assigned to tenant #1 (231). Global role #1 (310) includes rights A, B, C, D, and E, while rights bundles #1 and #3 (221, 223) collectively include rights A, B, D, and E. The filtered rights available to User 1 are those that overlap between the relevant global role and rights bundles, resulting in rights A, B, D, and E. These rights are shown in the righthand column of FIG. 4 next to User 1.

With respect to User 2, the filtered rights available to that user are those that exist in the intersection between global role #2 (320), assigned to User 2, and rights bundles #1 and #3 (221, 223) assigned to tenant #1 (231). Global role #2 (320) includes rights C, D, and E, while rights bundles #1 and #3 (221, 223) collectively include rights A, B, D, and E. The filtered rights available to User 2 are those that overlap between the relevant global role and rights bundles, resulting in rights D and E. These rights are shown in the righthand column of FIG. 4 next to User 2.

With respect to User 3, the filtered rights available to that user are those that exist in the intersection between global role #3 (330), assigned to User 3, and rights bundles #1 and #3 (221, 223) assigned to tenant #1 (231). Global role #3 (330) includes right E, while rights bundles #1 and #3 (221, 223) collectively include rights A, B, D, and E. The filtered rights available to User 3 are those that overlap between the relevant global role and rights bundles, resulting in right E. This right is shown in the righthand column of FIG. 4 next to User 3.

Similar examples are provided for additional users of tenants #2 and #3 (232, 233). Tenant #2 (232) can include two users, denoted as User 4 and User 5 in FIG. 4. Tenant #2 (232) has two global roles available to it and chooses to assign global role #1 (310) to User 4 and global role #3 (330) to User 5.

With respect to User 4, the filtered rights available to that user are those that exist in the intersection between global role #1 (310) assigned to User 4, and rights bundle #2 (222) assigned to tenant #2 (232). Global role #1 (310) includes rights A, B, C, D, and E, while rights bundle #2 (222) includes rights C and D. The filtered rights available to User 4 are those that overlap between the relevant global role and rights bundles, resulting in rights C and D. These rights are shown in the righthand column of FIG. 4 next to User 4.

With respect to User 5, the filtered rights available to that user are those that exist in the intersection between global role #3 (330) assigned to User 5, and rights bundle #2 (222) assigned to tenant #2 (232). Global role #3 (330) includes right E, while rights bundle #2 (222) includes rights C and D. The filtered rights available to User 5 are those that overlap between the relevant global role and rights bundles, but no such rights exist. As a result, User 5 has not been provisioned any filtered rights.

Tenant #3 (233) can include two users, denoted as User 6 and User 7 in FIG. 4. Tenant #3 (233) has two global roles available to it and choose to assign global role #2 (320) to User 6 and global role #3 (330) to User 7.

With respect to User 6, the filtered rights available to that user are those that exist in the intersection between global role #2 (320) assigned to User 6, and rights bundles #2 and #3 (222, 223) assigned to tenant #3 (233). Global role #2 (320) includes rights C, D, and E, while rights bundles #2 and #3 (222, 223) includes rights C, D, and E. The filtered rights available to User 6 are those that overlap between the relevant global role and rights bundles, resulting in rights C, D, and E. These rights are shown in the righthand column of FIG. 4 next to User 6.

With respect to User 7, the filtered rights available to that user are those that exist in the intersection between global role #3 (330) assigned to User 7, and rights bundles #2 and #3 (222, 223) assigned to tenant #3 (233). Global role #3 (330) includes right E, while rights bundles #2 and #3 (222, 223) includes rights C, D, and E. The filtered rights available to User 7 are those that overlap between the relevant global role and rights bundles, resulting in right E only. This right is shown in the righthand column of FIG. 4 next to User 7.

Figure 5:
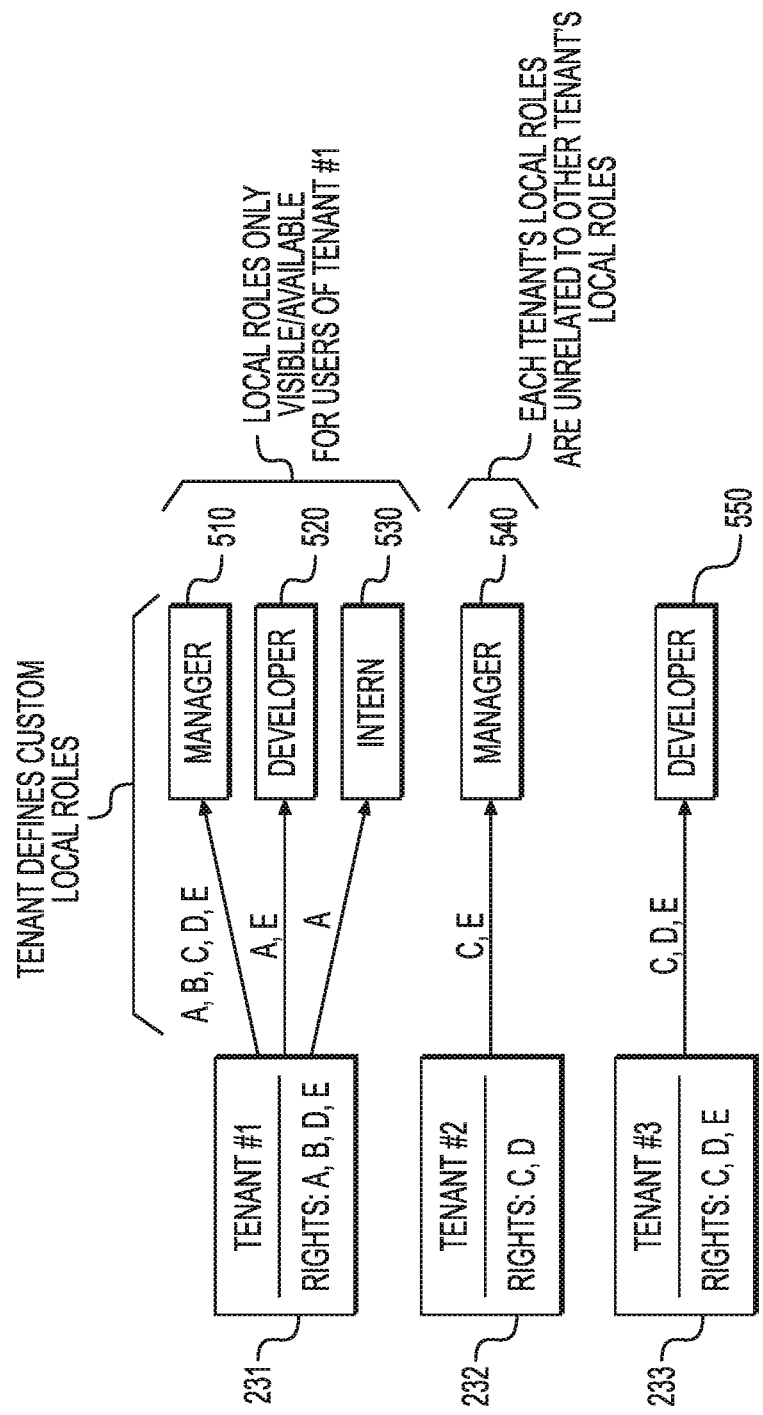
FIG. 5 is a diagram of an example method for assigning local roles to users within a tenant.

FIG. 5 provides a diagram for assigning local roles to users within a tenant, including the intersection of rights available to the tenant and rights available to a local role (referred to herein as custom rights, to distinguish from the filtered rights described previously). FIG. 5 shows the same three tenants (231, 232, 233) as the previous drawings. In this example, each tenant defines one or more local roles that are only visible or available to that tenant.

For example, in this example tenant #1 (231) has defined local roles for a manager 510, developer 520, and intern 530. Tenant #1 (231) has assigned potential rights A, B, C, D, and E to the manager role 510, potential rights A and E to the developer role 520, and potential right A to the intern role 530. The custom rights available to each local role are those that exist in the intersection between the local role assigned to the user and the rights bundles assigned to the tenant.

With respect to the manager role 510 of tenant #1 (231), for example, the manager role 510 includes potential rights A, B, C, D, and E, while rights bundles #1 and #3 (221, 223) assigned to tenant #1 (231) include rights A, B, D, and E. The custom rights available to the manager role 510 are those that overlap between the two, resulting in custom rights A, B, D, and E being assigned or provisioned to the user associated with the manager role 510.

With respect to the developer role 520 of tenant #1 (231), the developer role 520 includes potential rights A and E, while rights bundles #1 and #3 (221, 223) assigned to tenant #1 (231) include rights A, B, D, and E. The custom rights available to the developer role 520 are those that overlap between the two, resulting in custom rights A and E being assigned or provisioned to the user associated with the developer role 520.

With respect to the intern role 530 of tenant #1 (231), the intern role 530 includes potential right A while rights bundles #1 and #3 (221, 223) assigned to tenant #1 (231) include rights A, B, D, and E. The custom rights available to the intern role 530 are those that overlap between the two, resulting in custom right A being assigned or provisioned to the user associated with the intern role 530.

Continuing on with FIG. 5, tenant #2 (232) includes a manager role 540. This manager role 540 is created by tenant #2 (232) and unrelated to the manager role 510 created by tenant #1 (231). For example, the manager role 540 includes potential rights C and E, while rights bundle #2 (222) assigned to tenant #2 (232) includes rights C and D. The custom rights available to the manager role 540 are those that overlap between the two, resulting in custom right C being assigned or provisioned to the user associated with the manager role 540.

Similarly, tenant #3 (233) includes a developer role 550. This manager role 540 is created by tenant #3 (233) and unrelated to the developer role 520 created by tenant #1 (231). For example, the developer role 550 includes potential rights C, D, and E, while rights bundle #2 and #3 (222, 223) assigned to tenant #3 (233) includes rights C, D, and E. The custom rights available to the developer role 550 are those that overlap between the two, resulting in custom rights C, D, and E being assigned or provisioned to the user associated with the developer role 550.

The various constructs for rights management explained above can be applied to a data center having both physical and virtual computing infrastructure. An example of such infrastructure is provided in FIG. 6. Specifically, FIG. 6 illustrates virtual data centers provided as an abstraction of underlying physical-data-center hardware components. A physical data center 602 is shown below a virtual-interface plane 604. The physical data center consists of a virtual-infrastructure management server ("VI-management-server") 606 and any of various different computers, such as PCs 608, on which a virtual-data-center management interface may be displayed to system administrators and other users. The interface can be a software-based control system, such as VMware™ vCloud Director™.

The physical data center additionally includes a number of server computers, such as server computer 610, that are coupled together by local area networks, such as local area network 612 that directly interconnects server computer 610 and 614-620 and a mass-storage array 622. The physical data center shown in FIG. 6 includes three local area networks 612, 624, and 626 that each directly interconnects a bank of eight servers and a mass-storage array. The individual server computers, such as server computer 610, each includes a virtualization layer and runs multiple virtual machines. Different physical data centers may include many different types of computers, networks, data-storage systems and devices connected according to many different types of connection topologies. The virtual-data-center abstraction layer 604, a logical abstraction layer shown by a plane in FIG. 6, abstracts the physical data center to a virtual data center comprising one or more resource pools, such as resource pools 630-632, one or more virtual data stores, such as virtual data stores 634-636, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability. It can migrate virtual machines to most effectively utilize underlying physical hardware resources, to replace virtual machines disabled by physical hardware problems and failures, and to ensure that multiple virtual machines supporting a high-availability virtual appliance are executing on multiple physical computer systems. This ensures the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

The virtual data center provided by a service provider can be configured through a control system interface displayed on a user device, such as a computer or smartphone. In some examples, both the service provider and the tenants of that service provider can access certain configuration information through a GUI associated with the control system. FIGS. 7-11 provide example GUIs that can be used to perform various configuration actions for the virtual infrastructure.

Figure 7:
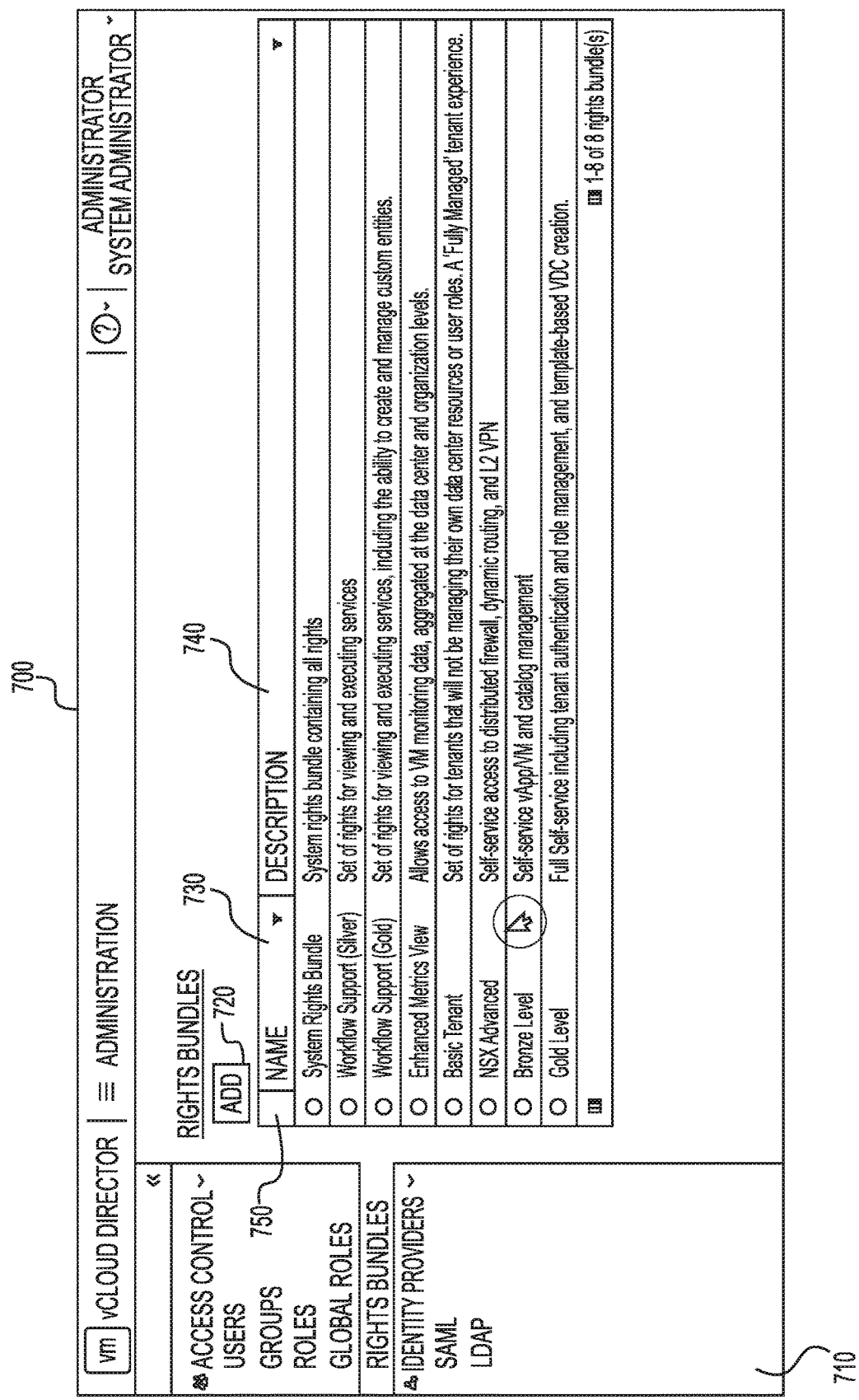
FIG. 7 is an example graphical user interface ("GUI") for creating and assigning rights bundles.

FIG. 7 is an illustration of an example GUI 700 for control software used to manage the virtual infrastructure offered to tenants. The GUI 700 can be displayed on any type of computing device, such as a desktop computer, laptop computer, smartphone, or tablet. The GUI 700 can be accessed through a web browser in some examples. The GUI 700 can include a menu 710 for accessing various functionality of the control software, such as "roles" (which equate to the aforementioned local roles), "global roles," and "rights bundles." In the example of FIG. 7, a user has selected a graphical element associated with rights bundles from the menu 710.

The GUI 700 displayed information regarding current rights bundles that are currently available in the system. These rights bundles can be installed automatically in some examples or can be added manually by an administrator. In some examples, the rights bundles are a mixture of default bundles and bundles added manually. For example, the "System Rights Bundle" can be a default rights bundle that includes all rights associated with the virtual infrastructure. Meanwhile, the "Enhanced Metrics View" rights bundle can be a manually added rights bundle that allows access to VM monitoring data. The GUI 700 includes a name column 730 that displays the name of each rights bundle, a description column 740 that provides a description of each rights bundle, and a radio button column 750 that allows for selection of one or more rights bundles. When one or more rights bundles are selected, the GUI 700 can display a graphical element for assigning those rights to tenants.

A user can select a rights bundle from the GUI 700, causing a new window to be launched that includes details regarding that rights bundle. Additionally, the user can select the "Add" button 720 to add a new rights bundle. FIG. 8 shows an example GUI 800 launched as a result of a user selecting the Add button 720.

The GUI 800 of FIG. 8 can include a name field 810 for naming the rights bundle, as well as a description field 820 for providing a description of the rights bundle. These fields can later be displayed in columns 730 and 740, respectively, of GUI 700. The GUI 800 of FIG. 8 can also include a rights box 830 that includes various rights that can be added to the bundle being created. The rights box 830 can include a variety of dropdown menus, each containing related rights that can be added. In the example of FIG. 8, the user has selected an administration drop-down menu, which allows the user to select options for viewing and managing administrative items. The user can save any selections by using the save button 850. Alternatively, the user can discard the new rights bundle by selecting the discard button 840.

Figure 9:
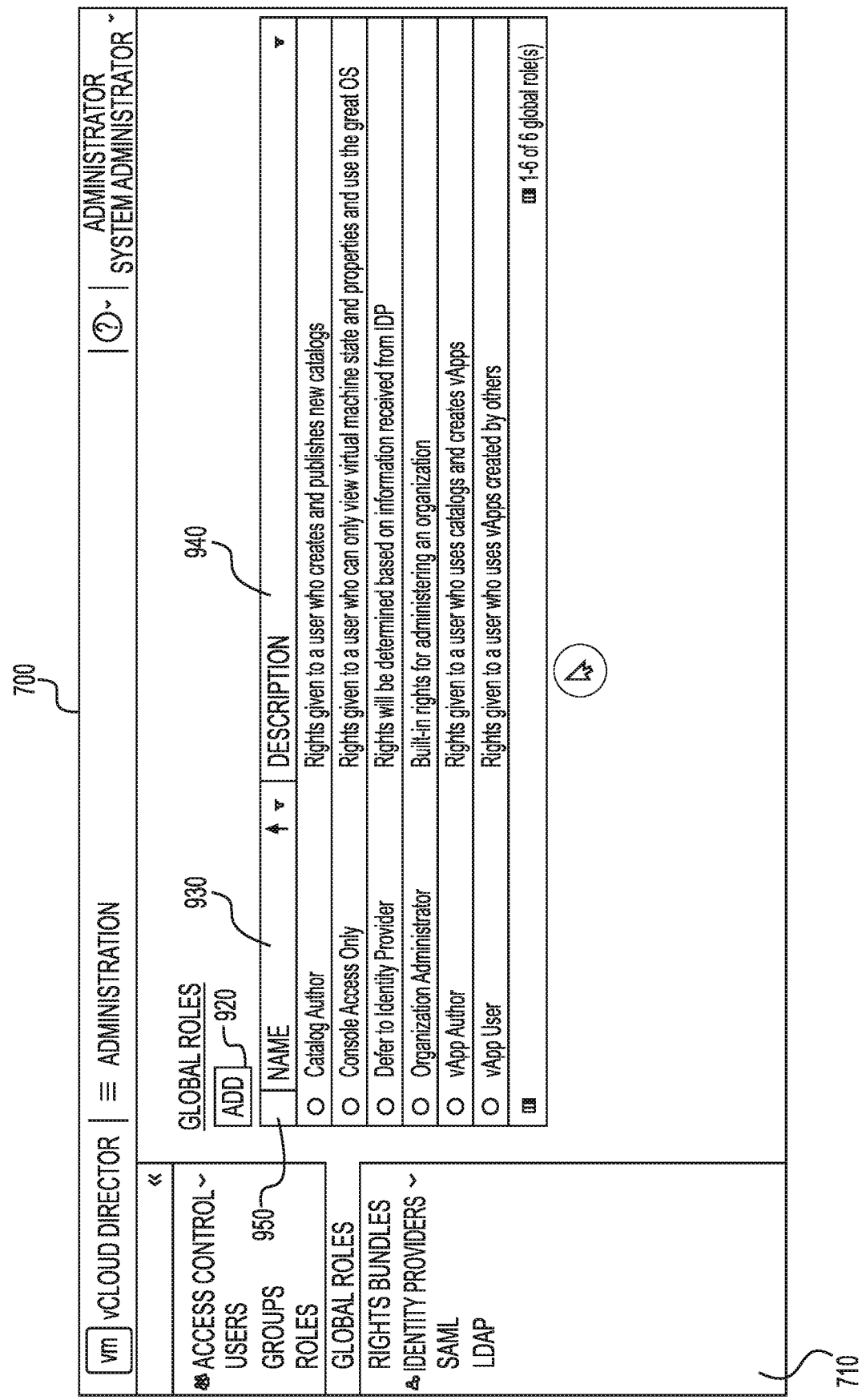
FIG. 9 is an example GUI for creating and assigning global roles.

FIG. 9 provides an illustration of the example GUI 700 from FIG. 7, but in this example the user has selected the "global roles" tab from the menu 710. The GUI view shown in FIG. 9 is intended to utilize a similar layout to the GUI in FIG. 7, while applying to global roles rather than rights bundles. For example, the GUI 700 includes a name column 930 that displays the name of each global role, a description column 940 that provides a description of each global role, and a radio button column 950 that allows for selection of one or more global roles. When one or more global roles are selected, the GUI 700 can display a graphical element for assigning those global roles to tenants.

Figure 10:
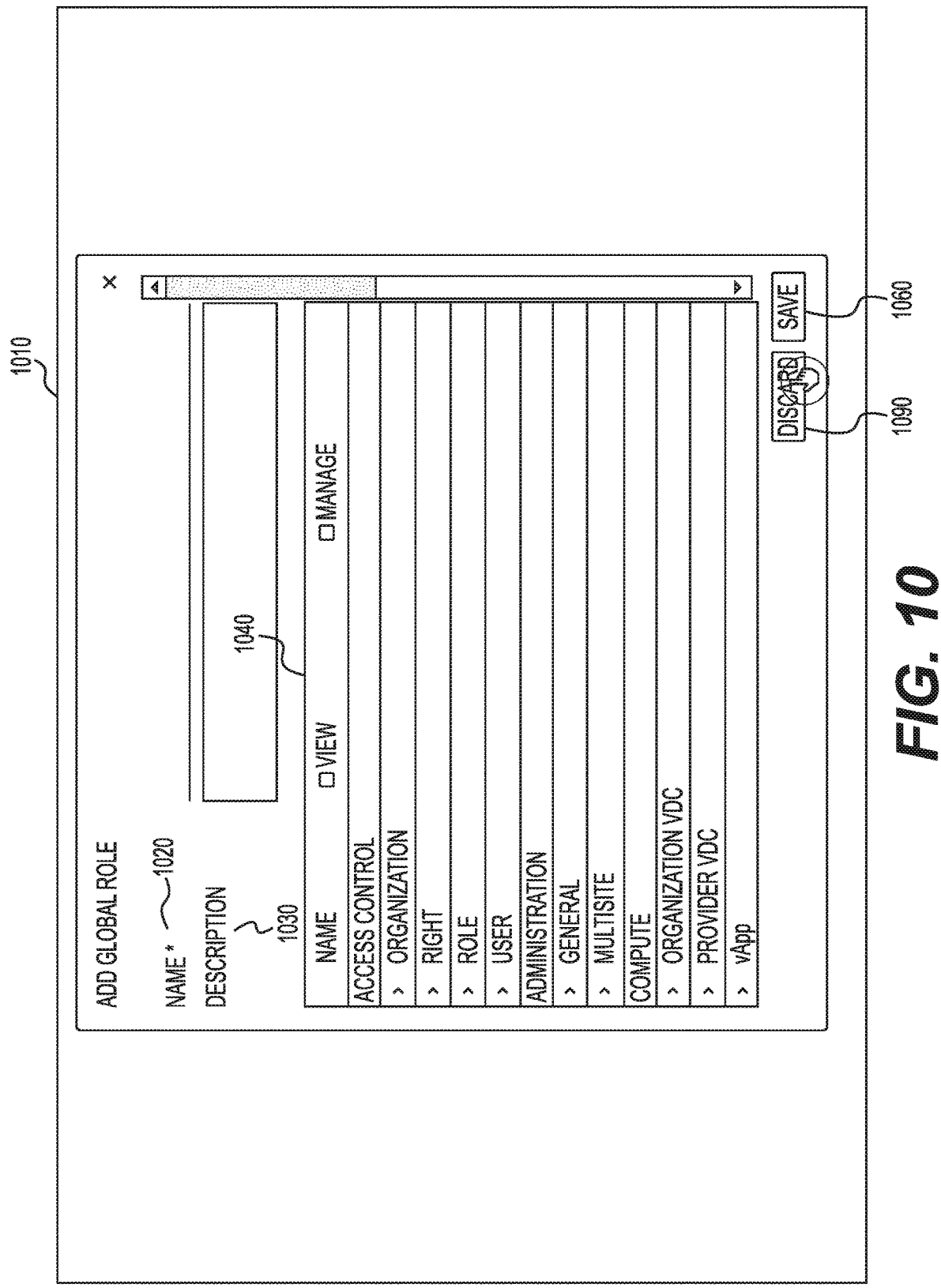
FIG. 10 is another example GUI for creating and assigning global roles.

A user can select a global role from the GUI 700, causing a new window to be launched that includes details regarding that global role. Additionally, the user can select the "New" button 920 to add a new global role. FIG. 10 shows an example GUI 1010 launched as a result of the user selecting the New button 920.

The GUI 1010 of FIG. 9 can include a name field 1020 for naming the global role, as well as a description field 1030 for providing a description of the global role. These fields can later be displayed in columns 930 and 940, respectively, of GUI 700. The GUI 1010 of FIG. 10 can also include a rights box 1040 that includes various rights that can be added to the global role being created. The rights box 1040 can include a variety of dropdown menus, each containing related rights that can be added. In the example of FIG. 10, the user has not expanded any of the dropdown menus. The user can save any selections by using the save button 1060 or discard the global role by selecting the discard button 1050.

Figure 11:
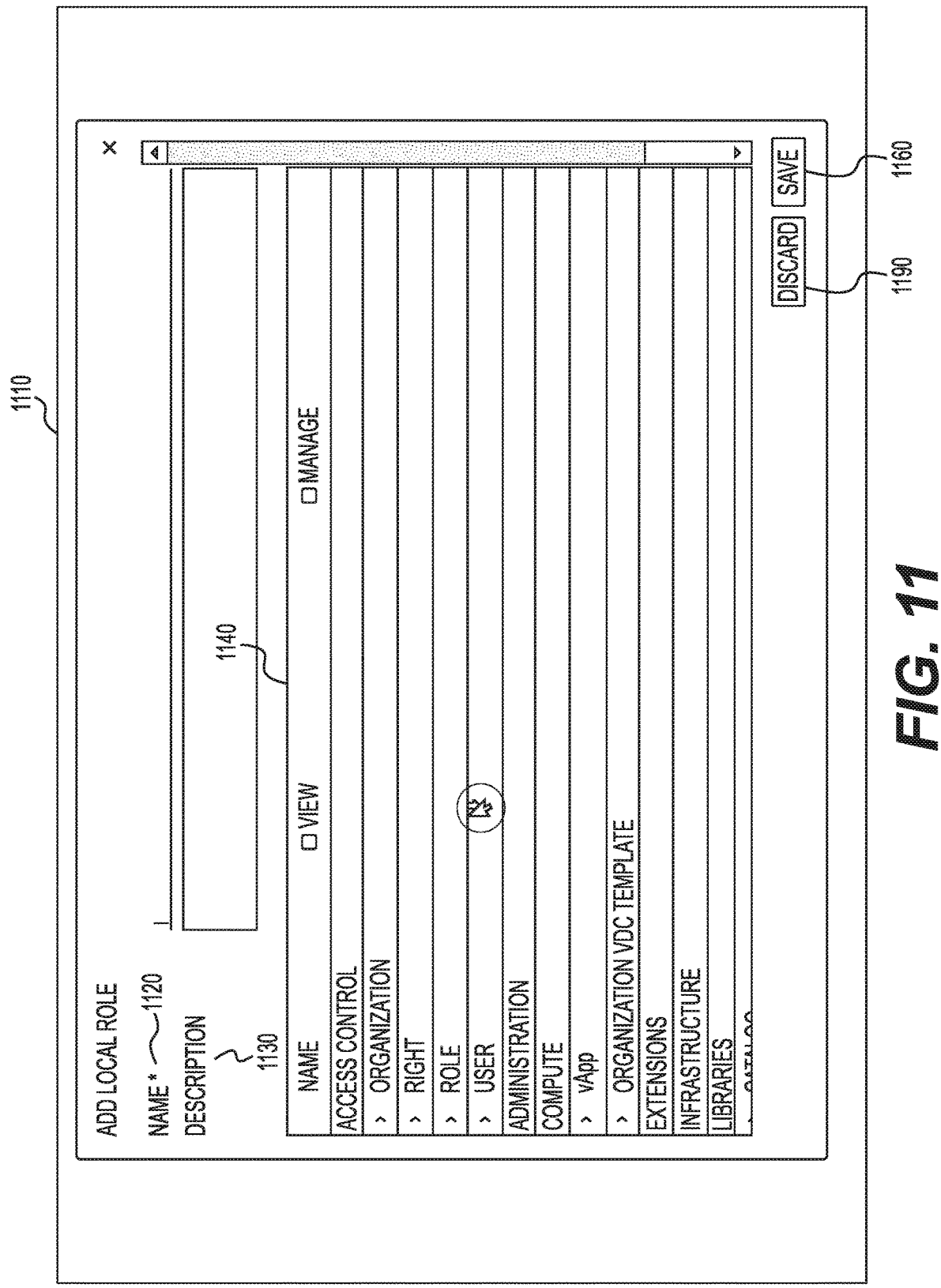
FIG. 11 is an example GUI for creating and assigning local roles.

Local roles can be added using similar GUI functionalities. For example, the user can select the "roles" tab from the menu 710 shown in FIGS. 7 and 9. The GUI 700 can display the existing local roles in a manner similar to that used for displaying the global roles or rights bundles. The user can add a new local role, causing the GUI 1110 of FIG. 11 to be launched. Similar to previous descriptions, the GUI 1110 can include a name field 1120 for naming the local role, as well as a description field 1130 for providing a description of the local role. The GUI 1110 can also include a rights box 1140 that includes various rights that can be added to the local role being created. The rights box 1140 can include a variety of dropdown menus, each containing related rights that can be added. In the example of FIG. 11, the user has not expanded any of the dropdown menus. The user can save any selections by using the save button 1160 or discard the global role by selecting the discard button 1150. Because this GUI 1110 relates to local roles, it can be accessed by a tenant to create local roles specific to that tenant.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for assigning rights to utilize cloud resources associated with a service provider's computing hardware, comprising:
    defining a rights package comprising a plurality of rights pertaining to utilization of the cloud resources, wherein the rights package is assignable to a tenant of the service provider's computing hardware, the tenant including a plurality of tenant users;
    defining a first global role comprising a first plurality of potential rights, wherein the first global role is assignable to individual tenant users of the tenant and wherein the first plurality of potential rights includes at least one right that is not included in the rights package;
    assigning the first global role to a first individual tenant user of the tenant; and
    provisioning first filtered rights to utilize the cloud resources to the first individual tenant user of the tenant based on the tenant assigning the first global role to the first individual tenant user,
    wherein the filtered rights include rights present in both the first plurality of potential rights defined for the first global role and the plurality of rights defined for the rights package.

2. The method of claim 1, further comprising:
    defining a second global role comprising a second plurality of potential rights, wherein the second global role is assignable to individual tenant users of the tenant;
    assigning the second global role to a second individual tenant user of the tenant; and
    provisioning second filtered rights to utilize the cloud resources to the second individual tenant user of the tenant, the second filtered rights including rights present in both the second plurality of potential rights defined for the first global role and the plurality of rights defined for the rights package assigned to the tenant,
    wherein the first filtered rights include at least one right that is not included in the second filtered rights, and
    wherein the first and second filtered rights are provisioned based on the tenant assigning the first and second global roles to the first and second individual tenant users, respectively.

3. The method of claim 2, wherein when the rights package is assigned to a plurality of tenants, modifying the rights package by the service provider causes the assigned rights packages to automatically update for each of the plurality of tenants.

4. The method of claim 1, wherein the global role can be assigned to a plurality of individual tenant users, each of the plurality of individual tenant users being associated with a separate tenant using the service provider's computing hardware.

5. The method of claim 1, further comprising:
    defining a local role comprising a third plurality of potential rights, the local role being defined by the tenant and specific to the tenant; and
    provisioning custom rights to utilize the cloud resources to a second tenant user assigned to the local role, wherein the custom rights include rights present in both the third plurality of potential rights defined for the local role and the first plurality of rights defined for the rights package.

6. The method of claim 1, wherein the rights package reflects rights defined by a service contract between the service provider and the tenant.

7. The method of claim 1, wherein an individual tenant user is authorized to exercise a VPN right pertaining to configuring VPN access to the cloud resources based on both the global role assigned to the individual tenant user and the rights package assigned to the tenant associated with the individual tenant user including the VPN right.

8. A non-transitory, computer-readable medium containing instructions that, when executed by a hardware-based processor, performs stages for assigning rights to utilize cloud resources associated with a service provider's computing hardware, the stages comprising:
    defining a rights package comprising a plurality of rights pertaining to utilization of the cloud resources, wherein the rights package is assignable to a tenant of the service provider's computing hardware, the tenant including a plurality of tenant users;
    defining a first global role comprising a first plurality of potential rights, wherein the first global role is assignable to individual tenant users of the tenant and wherein the first plurality of potential rights includes at least one right that is not included in the rights package;
    assigning the first global role to a first individual tenant user of the tenant; and
    provisioning first filtered rights to utilize the cloud resources to the first individual tenant user of the tenant based on the tenant assigning the first global role to the first individual tenant user,
    wherein the filtered rights include rights present in both the first plurality of potential rights defined for the first global role and the plurality of rights defined for the rights package.

9. The non-transitory, computer-readable medium of claim 8, the stages further comprising:
    defining a second global role comprising a second plurality of potential rights, wherein the second global role is assignable to individual tenant users of the tenant;
    assigning the second global role to a second individual tenant user of the tenant; and
    provisioning second filtered rights to utilize the cloud resources to the second individual tenant user of the tenant, the second filtered rights including rights present in both the second plurality of potential rights defined for the first global role and the plurality of rights defined for the rights package assigned to the tenant, wherein the first filtered rights include at least one right that is not included in the second filtered rights, and wherein the first and second filtered rights are provisioned based on the tenant assigning the first and second global roles to the first and second individual tenant users, respectively.

10. The non-transitory, computer-readable medium of claim 9, wherein when the rights package is assigned to a plurality of tenants, modifying the rights package by the service provider causes the assigned rights packages to automatically update for each of the plurality of tenants.

11. The non-transitory, computer-readable medium of claim 8, wherein the global role can be assigned to a plurality of individual tenant users, each of the plurality of individual tenant users being associated with a separate tenant using the service provider's computing hardware.

12. The non-transitory, computer-readable medium of claim 8, the stages further comprising:

defining a local role comprising a third plurality of potential rights, the local role being defined by the tenant and specific to the tenant; and provisioning custom rights to utilize the cloud resources to a second tenant user assigned to the local role, wherein the custom rights include rights present in both the third plurality of potential rights defined for the local role and the first plurality of rights defined for the rights package.

13. The non-transitory, computer-readable medium of claim 8, wherein the rights package reflects rights defined by a service contract between the service provider and the tenant.

14. The non-transitory, computer-readable medium of claim 8, wherein an individual tenant user is authorized to exercise a VPN right pertaining to configuring VPN access to the cloud resources based on both the global role assigned to the individual tenant user and the rights package assigned to the tenant associated with the tenant user including the VPN right.

15. A system for assigning rights to utilize cloud resources associated with a service provider's computing hardware, comprising:

a memory storage including a non-transitory, computer-readable medium comprising instructions; and a computing device including a hardware-based processor that executes the instructions to carry out stages comprising:

defining a rights package comprising a plurality of rights pertaining to utilization of the cloud resources, wherein the rights package is assignable to a tenant of the service provider's computing hardware, the tenant including a plurality of tenant users;

defining a first global role comprising a first plurality of potential rights, wherein the first global role is assignable to individual tenant users of the tenant and wherein the first plurality of potential rights includes at least one right that is not included in the rights package; and assigning the first global role to a first individual tenant user of the tenant; and provisioning first filtered rights to utilize the cloud resources to the first individual tenant user of the tenant based on the tenant assigning the first global role to the first individual tenant user, wherein the filtered rights include rights present in both the first plurality of potential rights defined for the first global role and the plurality of rights defined for the rights package.

16. The system of claim 15, the stages further comprising:

defining a second global role comprising a second plurality of potential rights, wherein the second global role is assignable to individual tenant users of the tenant;

assigning the second global role to a second individual tenant user of the tenant; and provisioning second filtered rights to utilize the cloud resources to the second individual tenant user of the tenant, the second filtered rights including rights present in both the second plurality of potential rights defined for the first global role and the plurality of rights defined for the rights package assigned to the tenant, wherein the first filtered rights include at least one right that is not included in the second filtered rights, and wherein the first and second filtered rights are provisioned based on the tenant assigning the first and second global roles to the first and second individual tenant users, respectively.

17. The system of claim 16, wherein when the rights package is assigned to a plurality of tenants, modifying the rights package by the service provider causes the assigned rights packages to automatically update for each of the plurality of tenants.

18. The system of claim 15, wherein the global role can be assigned to a plurality of individual tenant users, each of the plurality of individual tenant users being associated with a separate tenant using the service provider's computing hardware.

19. The system of claim 15, the stages further comprising:

defining a local role comprising a third plurality of potential rights, the local role being defined by the tenant and specific to the tenant; and provisioning custom rights to utilize the cloud resources to a second tenant user assigned to the local role, wherein the custom rights include rights present in both the third plurality of potential rights defined for the local role and the first plurality of rights defined for the rights package.

20. The system of claim 15, wherein an individual tenant user is authorized to exercise a VPN right pertaining to configuring VPN access to the cloud resources based on both the global role assigned to the individual tenant user and the rights package assigned to the tenant associated with the tenant user including the VPN right.

* * * * *